United States Patent [19]

Walitalo et al.

[11] 4,064,776

[45] Dec. 27, 1977

[54] APPARATUS FOR MAKING TEAR RESISTANT SEPARABLE END-CONNECTED BAGS

[75] Inventors: Charles R. Walitalo, Matteson; Alvin E. Ericson, Chicago, both of Ill.

[73] Assignee: Union Carbide Corporation, New York, N.Y.

[21] Appl. No.: 696,297

[22] Filed: June 15, 1976

Related U.S. Application Data

[62] Division of Ser. No. 527,430, Nov. 26, 1974, abandoned.

[51] Int. Cl.² .............................................. B26D 7/10
[52] U.S. Cl. ............................................. 83/171; 83/16; 83/195; 93/54
[58] Field of Search ................... 83/171, 16, 695, 678, 83/660, 54

[56] References Cited

U.S. PATENT DOCUMENTS

| | | | |
|---|---|---|---|
| Re. 28,911 | 7/1976 | Jespersen | 83/678 |
| 371,736 | 10/1887 | Burton | 83/678 X |
| 1,518,260 | 12/1974 | Hislop | 83/678 X |
| 1,972,133 | 9/1934 | Darrow | 83/171 X |
| 2,748,863 | 6/1956 | Benton | 83/171 |
| 3,590,695 | 7/1971 | Gerard | 83/678 X |

*Primary Examiner*—J. M. Meister
*Attorney, Agent, or Firm*—Maurice W. Ryan

[57] ABSTRACT

Continuous strip closed-bottom open-mouthed packaging bags are produced by continually making, at spaced intervals in a continuous flattened tubular oriented plastic film supply, a transversely extending heat seal to define a bag bottom, and, adjacent each heat seal, perforating the two plies of the film supply with a blade heated to effect annealing of the edges of the perforations and having a serrated cutting edge with spaced deep recesses to define connecting tabs between perforations.

2 Claims, 4 Drawing Figures

U.S. Patent     Dec. 27, 1977     4,064,776
FIG. 1
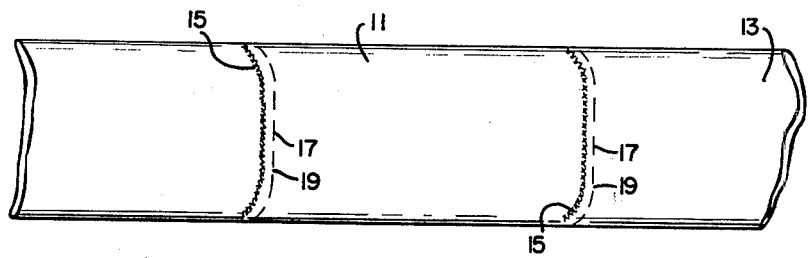
FIG. 2
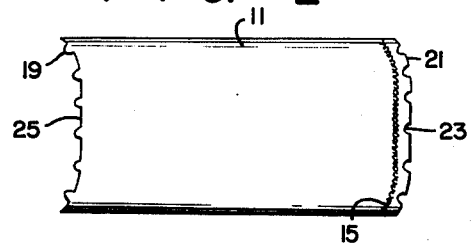
FIG. 3
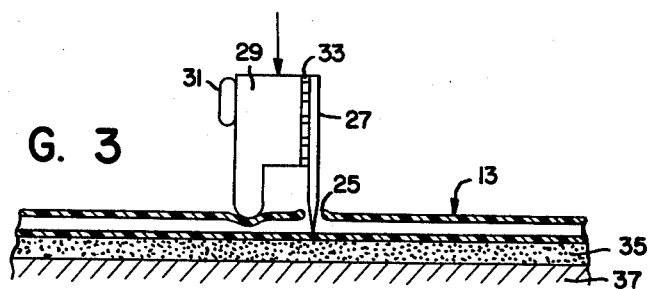
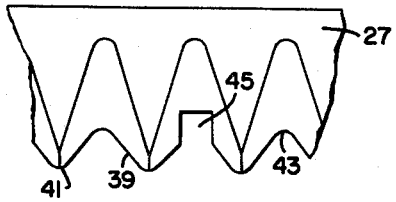
FIG. 4

APPARATUS FOR MAKING TEAR RESISTANT SEPARABLE END-CONNECTED BAGS

This application is a division of our prior U.S. application Ser. No. 527,430 filed Nov. 26, 1974 and now abandoned.

This invention relates to flexible plastic film sheet packaging materials, particularly to flexible plastic film packaging bags, and more particularly to continuous strip separable oriented plastic film packaging bags which have good high tear resistant mouth edges capable of withstanding stretching stresses in packaging utilizations.

Packaging operations in industry, particularly those involving comestible products, meat for instance, require the maintenance of strict sanitary conditions. In many automatic and semiautomatic meat packaging operations, a consistently reliable supply source of usable packaging bags is of the greatest importance. Bags which tend to tear or give off one form or another of scrap materials, produce their own self contamination and can render useless what might otherwise be an efficacious packaging technique. It is also desirable that the bags fit the articles being packaged as closely and snugly as possible, not only for aesthetic reasons but to effect better heat shrinking where this step is used and to avoid packaging material waste. Close fitting article packaging usually requires that bag mouths be stretched and it is essential that the bag mouth edges be capable of withstanding the requisite stretching stresses without tearing or developing weak spots which will subsequently tear or fail and thus destroy the complete package article.

Plastic film wrapping sheets and bags in continuous strips or strands, perforated to provide tear off lines for one at a time removal of the wrapping units, have been commercially available for some time now. The general technique of forming continuous strands of separable end-connected plastic film packaging units by perforating the material between individual units has been used intermediately in commercial production where the final product is a multiplicity of stacked or otherwise bundled individual sheets or bags. While the continuous strand perforated-connected mode of bag making works acceptably well with unoriented plastic films, it has been found to present serious problems with oriented plastic films which are currently in wide use as packaging materials in both sheet and bag form.

The problems present in using the aforediscussed perforation techniques on continuous plastic tubing to produce packaging bags of oriented plastic film are particularly manifest when these bags are used ultimately in situations involving bag mouth stretching. It has been found that any irregularity in the perforating blade used such as a nick or scratch will produce a corresponding defect in the perforated edge of the bag mouth which, upon the incidence of any stretching stress, will propagate into a ruinous tear, rendering the bag useless.

Towards solving this problem, oriented plastic film bags have been made according to the continuous strip technique using a heated blade to melt the plastic being perforated and thus obviate the occurrence of unwanted nicks, fissures and other imperfections. Efforts in this direction, however, cause another unwanted result, that is the welding closed of the bag mouths. Bags produced prior to the time of the present invention have therefore had to undergo an additional manufacturing step involving the cutting or guillotining off of each welded closed bag mouth to produce a bag with a clean cut open mouth.

In general then, it may be stated that while the art provided for the making of continuous strip end-connected perforated separable bags of unoriented plastic film, there has been, prior to the time of this invention, no comparable method available for the making of continuous strip end-connected packaging bags of oriented plastic film.

With this then being the state of the art, the present invention was conceived and developed with the primary purpose of providing a technique for the manufacture of packaging sheets or bags of oriented plastic film in continuous strip form with each unit thereof readily separable from the strip into a unitary article having edges of its erstwhile connecting perforations resistant to tearing.

The invention further provides a manufacturing method for the production of packaging bags having tear resistant mouth edges formed in the same step as is the perforating between individual bags.

A further important feature of the present invention is its provision of a manufacturing technique for oriented plastic film packaging bags without the inclusion of heretofore necessary cumbersome and wasteful production steps.

These and other objects, features, and advantages of the invention will become the more readily apparent from the ensuing more detailed description and from the drawings wherein:

FIG. 1 is a planform view of a strand of packaging bags according to the present invention, FIG. 2 is a planform view of a single packaging bag according to the invention, FIG. 3 is a sectional elevation of an arrangement of film heat sealing and perforating apparatus according to the invention, and FIG. 4 is a detailed view of a portion of a perforating blade according to the invention.

In general the invention comprehends a flexible oriented plastic film material packaging sheet having at least one edge defined by discontinuous annealed edge lengths and tabs between respective adjacent said edge lengths. In the form of a packaging bag, the invention may comprehend a flexible oriented plastic film packaging bag having a heat sealed closed bottom and an open mouth with an edge defined by discontinuous annealed edge lengths and tabs between respective adjacent said edge lengths.

The method for making a sheet of flexible oriented plastic film material according to the invention comprises the steps of forming a continuous strand of separable edge-connected flexible oriented plastic film sheets by advancing a continuous length of said material to a sheet perforating station, cutting elongate perforations through said material transversely to the direction of its advance, forming interperforation tabs tear-oriented into one sheet and connecting each sheet to a contiguous sheet in the strand, annealing the cut edges of said perforations, and tear-removing said sheet from said continuous strand.

The method for making a packaging bag of flexible oriented plastic film material according to the invention involves steps similar to those described above for the making of a sheet except that the sheet comprises two plies of a continuous length of flattened flexible plastic film tubing and with the additional step of forming a heat seal transversely across the flattened flexible plastic film tubing to seal the opposed walls thereof into a bag bottom.

Apparatus to form discontinuous annealed edged perforations separated by tabs in flexible plastic film sheet material according to the invention, comprises, in combination, a serrated edged cutting blade having recesses disposed at spaced intervals extending into the blade from its cutting edge to beyond its cutting edge, and means to heat the blade to a preselected temperature corresponding to the annealing temperature of the material to be processed.

Here it should be noted that while in its broadest connotation the invention comprehends plastic film sheet material, the sheet, as such, may have more than one layer or ply, as is the case for instance with flattened tubular bag stock film supplies. It is also to be understood that where the term tubular is used it is not intended to refer only to seamless tubing, but to also include flat sheet materials which have been folded over and heat sealed or otherwise seamed into tubing configuration.

In practicing the present invention, a heated piercing blade with specially modified teeth sections is used under controlled penetration and temperature to perforate the film in making connected plastic film bags. The modified sections of the blade result in the formation of connecting tabs of film attaching individual bags to each other and the other portions of the blade completely sever or cut the film in a characteristic tooth pattern along the perforation cut edge which tends to minimize film damage. By heating the perforating blade to a temperature slightly below the melting point of the film, the elongate perforate cuts in the film are modified and improved. The heated blade softens the film making it less vulnerable to nicking and fracturing by the piercing and cutting action of the blade, and deorients and anneals the cut edges thus preserving the physical integrity of these edges against nicks and fractures. The heat of the blade determines the performance and strength of the bag mouth and strength of connecting tabs for any given film. The cutting and heating process results in strong open bag mouths on connected oriented film bags capable of withstanding considerable elongation or stretching in many packaging applications.

A commercially available serrated edged cutting blade is modified to pierce and cut the film in making connected oriented plastic film bags according to the invention. The conventional blade has a serrated edge tooth configuration which obviates the dull puncturing effect of straight edged blades, and uniformly cuts and penetrates through the film into a resilient backing base. As the blade penetrates through the film, the film is cut or severed progressing from the initial piercing of the teeth points and is completely severed as the crevices between the angle shaped teeth pass through the film. The cut edge of the film has a wave pattern characteristic of the serrated edge tooth configuration which tends to minimize ragged or nicked cut edges caused by erratic propagation of cuts following the orientation direction of the film.

The connecting tabs of film attaching individual bags to each other are made by a modified tooth section which partially severs the film. At selected spaced points along the blade, the crevice between teeth points is deepened to form the tabs as the standard areas of the blade completely sever through the film to make the elongate perforation. The deepened crevice is angled to direct the tear propagation in tab separation in the desired direction.

It is known that by heating a plastic film cutting blade to a temperature below the melting point of the film, the piercing and cutting performance of the blade is enhanced and blade life prolonged.

A heated blade also tends to reduce film fracturing from the puncturing of the film by the blade teeth. Due to the mild alteration of the film molecular structure caused by the heat the blade penetrates and passes through the film with less applied force. The film softened by the heated blade also cuts more uniformly and with smoother cut edges.

In the present invention the perforating blade is heated to a temperature somewhat higher than heretofore used in bag making techniques and the cut edge of the film is heated by the blade to a point of annealing which shrinks back and thickens the cut edge of the film. Nicks or fractures, to the extent that they occur at all, in such annealed film edges do not propagate readily when stress is applied in stretching the film. The annealing process does not fuse the film plies together.

In the present invention, a blade modified as described hereinabove is mounted adjacent a sealing bar comprised in a bag forming station. As opposed to the conventional type perforating blade which melts through the film, the blade according to the invention operates at a temperature which anneals the film. This temperature of course varies according to the type film being processed and the desired perforation and connecting tab configuration. In order to obtain the somewhat lower perforating blade temperature required for annealing from the sealing bar heat source, the blade may be separated from the sealing bar by an arrangement of insulator spacers to define an air space which diminishes the heat transfer. By adjusting this separation the desired temperature differential is obtained. It is also possible, and in some cases more advantageous, to provide a separate heat and temperature control for the blade.

Turning to the drawings, FIG. 1 shows packaging bags 11 according to the invention in a continuous strand made from a flattened tubular film supply stack 13. The bags 11 are defined by a bottom forming heat seal 15 extending transversely across the flat width of the tubing and, adjacent each heat seal 15, elongate discontinuous perforations 17 through both plies of the tubular stock 13. The film material left between the perforations 17 defines connecting tabs 19 which hold the bags together in the strand.

A bag which has been tear removed from the strand shown in FIG. 1 is shown in FIG. 2. The interperforation tabs 19 are so formed in the film that upon tearing a bag from the strand, the tearing will tend to propagate into the tail 21 of film material immediately adjacent the heat seal of the next bag leaving notches 23 therein. The mouth perforation edges 25 of the bag 11 shown in FIG. 2 of the drawings are, according to the present invention, annealed.

FIG. 3 shows an assembly of apparatus including a blade 27, a heat sealing bar 29, a heat source 31 all arranged to reciprocate vertically at a bag forming station. The blade 27 is mounted on the sealing bar 29 through spacers 33 and the heat source 31 provides heat to both these elements, maintaining the sealing bar at a temperature to effect heat sealing of the film plies to form bag bottoms, and maintaining the blade at a temperature to effect annealing of the film material perforate cut edges. As shown in FIG. 3, a tubular plastic film supply stock 13 is disposed beneath the sealing bar and perforating blade on a resilient backing 35 subtended by a base 37. With the film supply stock thus advanced to the position shown, the sealing bar, perforating blade assembly is brought down to substantially simultaneously form a bag bottom heat seal with the sealing bar 29, and an array of tab-separated annealed edge elongate perforations with the blade 27. In the position illustrated in FIG. 3, the blade 27 is shown as having cut through one, the upper, of the two plies of the flattened tubing supply stock and with its cutting edge teeth in incipient piercing contact with the upper surface of the lower ply of the tubing. The spacing between the plies is exaggerated in the drawing for the purposes of illustration. Actually the plies are in wall to wall contact throughout the bag forming procedures described.

FIG. 4 shows a detail of a blade 27 having a serrated cutting edge indicated generally at 39 defined by teeth 41 and crevices 43. At selected spaced points along the cutting edge 39 of blade 27, tab forming recesses or gullets 45 are provided. In the illustrated embodiment a rectangular form of gullet 45 is shown at the apex of a crevice 43. This is the preferred arrangement, but gullets may be other than rectangular in form and may be disposed at the teeth apexes or elsewhere along the cutting edge. It is the recesses or gullets 45 which define the tabs 19 between the perforations 17 since they ride down over uncut portions of film after the cutting edge 39 of the blade 27 has passed completely through the film in process.

The exact temperatures, cutting pressures, advancing speeds and other applications parameters to practice the present invention will be, in the light of this disclosure, well within the ken of persons conversant with the art.

Several types of plastic packaging bags have been made successfully with and according to this invention, including bags of biaxially oriented polyethylene film and of biaxially oriented polyvinylidene chloride and such bags were found to exhibit significantly improved mouth tear resistance under stretching stresses by comparison with other bags not according to the invention.

The foregoing disclosure is intended to be descriptive only of the invention, and is not to be construed in any limiting sense.

We claim:

1. Apparatus for forming discontinuous annealed edged perforations separated by tabs in flexible plastic film sheet material comprising, in combination, a serrated edged cutting blade having recesses disposed at spaced intervals extending into the blade from its cutting edge to beyond its cutting edge, said recesses being disposed at the apexes of crevices in the serrated edge of the blade, and means to heat the blade to a preselected temperature lower than the melting temperature of the plastic film sheet material in process, at which temperature the material will anneal.

2. Apparatus according to claim 1 wherein said recesses are substantially rectangular in form.

* * * * *